United States Patent [19]

Takahashi et al.

[11] Patent Number: 5,528,951

[45] Date of Patent: Jun. 25, 1996

[54] LINEAR ACTUATOR USING A SCREW MECHANISM

[75] Inventors: Yoshikazu Takahashi; Masayuki Tamura, both of Gumma, Japan

[73] Assignee: Mitsuba Electric Manufacturing Co., Ltd., Gumma, Japan

[21] Appl. No.: 237,792

[22] Filed: May 4, 1994

[30] Foreign Application Priority Data

May 11, 1993 [JP] Japan ..................... 5-132881

[51] Int. Cl.$^6$ ............. F16H 25/24; F16B 39/284
[52] U.S. Cl. ............ 74/441; 74/89.14; 74/89.15; 74/459; 411/277
[58] Field of Search ............ 74/441, 459, 89.14, 74/89.15; 411/277

[56] References Cited

U.S. PATENT DOCUMENTS

| | | | |
|---|---|---|---|
| 1,902,912 | 3/1933 | Sharp | 411/277 |
| 2,255,384 | 9/1941 | Hood | 411/277 |
| 2,686,546 | 8/1954 | MacLean, Jr. | 411/277 |
| 2,923,339 | 2/1960 | Skidmore | 411/277 |
| 3,391,721 | 7/1968 | Rosan | 411/277 |
| 3,674,075 | 7/1972 | Hoegee | 411/277 |
| 3,831,460 | 8/1974 | Linley, Jr. | 74/441 X |
| 4,633,732 | 1/1987 | Nishikawa et al. | 74/441 X |
| 4,967,618 | 11/1990 | Matsumoto et al. | 74/441 X |
| 5,150,872 | 9/1992 | Isomura | 74/425 X |

Primary Examiner—Allan D. Herrmann
Attorney, Agent, or Firm—Skjerven, Morrill, MacPherson, Franklin & Friel; Thomas S. MacDonald

[57] ABSTRACT

A linear actuator using a screw mechanism is provided which can be made free from play and can operate in a smooth fashion without involving any unacceptably rigorous tolerance control. An external thread of a screw rod is in threading engagement with an internal thread of a nut member for converting a rotational movement of the nut member into a linear movement of the screw rod, and a localized region of relatively tight fit is provided in the threading engagement. In particular, when the nut member is made of a molded plastic member, the localized region of relatively tight fit can be easily formed by grinding or cutting a part of the molding core for molding the internal thread of the nut member.

12 Claims, 3 Drawing Sheets

LINEAR ACTUATOR USING A SCREW MECHANISM

TECHNICAL FIELD

The present invention relates to a linear actuator comprising a nut member and a screw rod threadably engaging with the nut member for converting the rotational movement of the nut member or the screw rod into a linear movement of the screw rod or the nut member. It should be noted that the rotational movement and the linear movement should be understood in a relative sense. As a matter of fact, when there is a rotational movement between the two members, it is possible to obtain a linear movement either from the screw rod or the nut member depending on how the two members are restrained or guided.

BACKGROUND OF THE INVENTION

A linear actuator consisting of a screw mechanism for converting a rotational movement of an electric motor into a linear movement of an output member is widely used as actuators in power seats for vehicles which allow various parts of the seat to be adjusted. In such a linear actuator, a nut member provided with an internal thread is supported by a frame so as to be rotatable by an electric motor but to be immovable in the axial direction, and a screw rod provided with an external thread is threadably engaged with the nut member so as to be axially moveable but not to be rotatable. Thus, by rotating the nut member around its axial center line, the nut member is made to undergo a linear movement.

In such a screw mechanism, it is necessary to provide a certain amount of play or a dimensional tolerance between the threads of the screw rod and the nut member so that the smooth operation of the screw mechanism may be ensured without requiring any undue dimensional accuracy in the fabrication process.

Because a vehicle seat is subjected to acceleration and deceleration, it is necessary to be sufficiently rigid for the vehicle occupant to be comfortably seated. If there is any excessive play in the threading engagement, it will not only cause discomfort to the vehicle occupant but also undesirable impulsive stresses to various parts of the screw mechanism which are detrimental to the durability of the power seat mechanism. On the other hand, if an excessive tight fit is used for the threading engagement, the friction in the screw mechanism may become unacceptably great. If the dimensional tolerance of the threading engagement is made more rigorous so that proper fit may be ensured at all times, some difficulty may be created in controlling the dimensional precision, and the fabrication cost will be increased.

BRIEF SUMMARY OF THE INVENTION

In view of such problems of the prior art, a primary object of the present invention is to provide a linear actuator using a screw mechanism which can be made free from play without involving any unacceptably rigorous tolerance control.

A second object of the present invention is to provided a linear actuator using a screw mechanism which can be made free from play without unduly increasing the friction of the screw mechanism during operation.

A third object of the present invention is to provided a linear actuator using a screw mechanism which can ensure a proper fit in the threading engagement in an economical fashion.

These and other objects of the present invention can be accomplished by providing a linear actuator, comprising: a first member provided with an internal thread; and a second member provided with an external thread which is in threading engagement with the internal thread for converting a relative rotational movement between the first and second members into a relative linear movement between the first and second members; a localized region of relatively tight fit being provided in the threading engagement.

Thus, a play which might be present in a threading engagement can be easily minimized without reducing the smoothness of the relative movement between the mutually threading two parts, and the rigidity of the member to be actuated can be ensured.

A tight fit can be accomplished either by increasing an outer diameter of the external thread or increasing an inner diameter of the internal thread. When the first member is made of a molded plastic member, it is particularly preferable to dimension a crest and/or a root of the internal thread so as to be relatively tightly fit with a root and/or a crest of the external thread because it can be easily and economically accomplished simply by grinding or cutting a part of the molding core for molding the internal thread. It is also the case when the first member is made of sintered metal or by compressing metal powder.

For the convenience of removing the molding core from the bore defining the internal thread by turning it, the localized region of relatively tight fit may provided in an axial end of the internal thread. For optimum results, the localized region of relatively tight fit should extend approximately one half the pitch of the threads.

According to a particularly preferred embodiment of the present invention, the linear actuator is intended for converting a rotative movement transmitted from a motor into a linear movement of an external member, and comprises a fixed housing, a worm gear defining a central bore provided with an internal thread, bearing means for supporting the worm gear on the housing so as to be rotatable around an axial line of the central bore, but constraining the worm gear against axial movement, a worm rotatively actuated by a motor and meshing with the worm gear, a screw rod having an external thread meshing with the internal thread, and functionally coupled with the external member, and guide means for guiding the screw rod for axial movement but constraining the screw rod against rotative movement.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
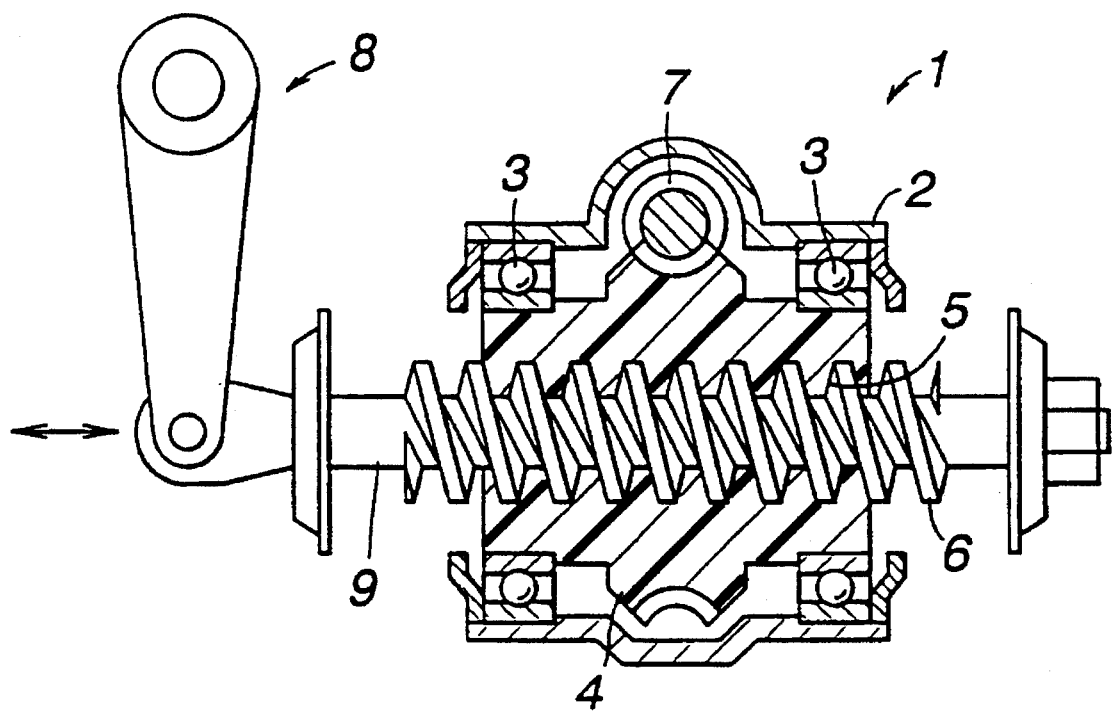
FIG. 1 is a longitudinal sectional view of a first embodiment of the linear actuator according to the present invention.

FIG. 1 shows a linear actuator according to the present invention. This linear actuator 1 is intended for use in an automotive power seat which can adjust various parts thereof by activating associated electric motors, and comprises a worm gear 4 or a nut member which is rotatably supported by a fixed housing 2 via a pair of ball bearings 3, and a screw rod 9 having an external thread 6 threadably engaging with an internal thread 5 provided in a central bore of the worm gear 4. The housing 2 is fixedly secured to a seat frame not shown in the drawing.

A worm 7 rotatively actuated by an electric motor not shown in the drawing meshes with the worm gear 4, and an output end of the screw rod 9 is connected to a member to be actuated (not shown in the drawing) via a link mechanism 8. The screw rod 9 is prevented from rotating by being so restricted by this link mechanism 8.

According to this linear actuator, as the worm 7 is rotated by the electric motor, the worm gear 4 rotates at a reduced rotational speed. Because the worm gear 4 is prevented from axial movement by the ball bearings 3, and the screw rod 9 in threading engagement with this worm gear 4 is prevented from rotational movement, as the worm gear 4 rotates, the screw rod 9 moves axially. Thus, the unillustrated member to be actuated is made to undergo a prescribed linear movement.

In such a screw mechanism, a certain amount of play is necessary in the threading engagement. However, an excessive play is undesirable because it will reduce the effective rigidity of the structure, and cause impulsive stresses.

Figure 2:
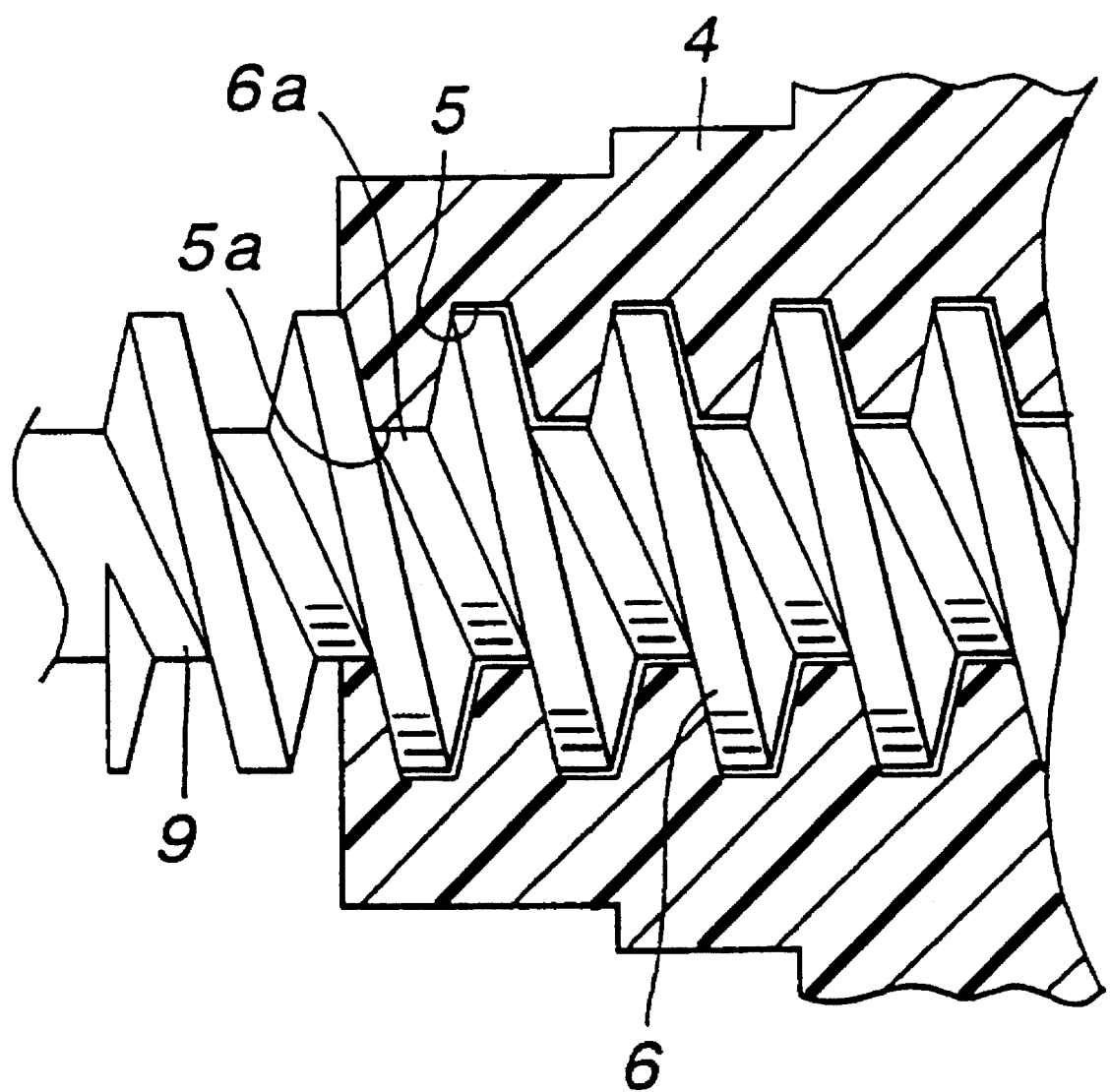
FIG. 2 is an enlarged sectional view showing a part of FIG. 1.

According to the first embodiment, as illustrated in FIG. 2, the tolerance of the minor diameter of the internal thread 5 provided in the central bore of the worm gear 4 is locally (for instance over half the pitch of the thread) reduced or, in other words, a region of a relatively tight fit is locally formed in the threading engagement. Or, more specifically, the threading engagement between the root 6a of the external thread 6 of the screw rod 9 and the crest 5a of the internal thread 5 of the worm gear 4 is made closer or tighter than the remaining part of the threading engagement between the internal and external threads 5 and 6. Here, the minor diameter of the internal thread 5 is meant as the diameter of the thread at the crest 5a. Thus, the screw rod 9 is more constrained in the axial direction, and the effective play in the threading engagement or the relative axial movement between the mutually threading two parts can be minimized. Furthermore, because the dimensional tolerance is made relatively more rigorous only in a localized part of the threading engagement, or the region of a tight fit is limited to a localized part, the friction between the two parts will not be significantly increased.

When the internal thread 5a of the worm gear 5 is made by molding plastic material, the cavity of the molding die will have a substantially same cross section as the produced worm gear 4, and the process of removing the molded worm gear 4 from the molding die set includes the step of turning and removing a molding core which has a die surface for molding the internal thread 5 of the worm gear 4. Therefore, if the dimensional tolerance of the internal thread were made more rigorous over the entire internal thread 5, the fabrication cost for the molding core would be increased as it has to be fabricated at a high precision so that excessive tight fit may not be created in any part of the threading engagement. However, according to the present invention, the dimensional tolerance is strict only locally, for instance at an axial end of the internal thread 5, the molding core can be fabricated at low cost. Furthermore, the molding core can be easily removed from the molded worm gear simply by designing the molding die set so that the closely engaged part in the engagement between the molding core and the internal thread may be separated at an initial part of the process of removing the molding core.

Figure 3:
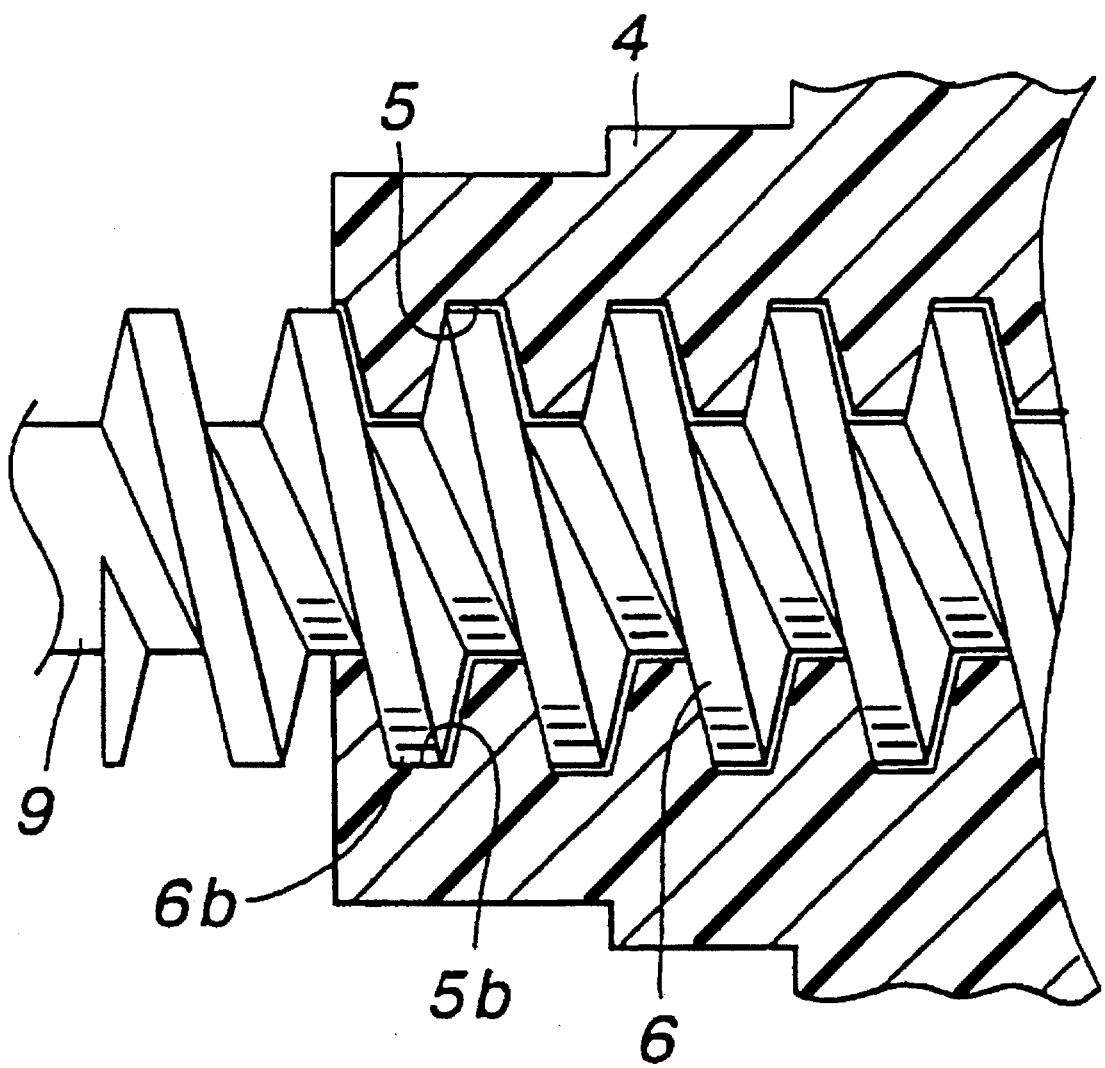
FIG. 3 is a view similar to FIG. 2 showing a second embodiment of the present invention.

FIG. 3 shows a second embodiment of the present invention, and the parts corresponding to those of the previous embodiment are denoted with like numerals. According to the second embodiment, the tolerance of the major diameter of the internal thread 5 provided in the central bore of the worm gear 4 is locally reduced, and the threading engagement between the crest 6b of the external thread 6 of the screw rod 9 and the root 5b of the internal thread 5 of the worm gear 4 is made closer or tighter than the remaining part of the threading engagement between the internal and external threads 5 and 6. Thus, the screw rod 9 is more constrained in the axial direction, and the effective play in the threading engagement or the relative axial movement between the mutually threading two parts can be minimized.

According to the above described embodiments, the localized parts of the internal thread having a reduced dimensional tolerance or a tighter fit can be easily made simply by cutting or grinding the outer surface of a part of the molding core, thereby allowing the molding core to be relatively economically prepared, and simplifying the control of dimensional precision. In particular, by providing a region of a tight fit only at an axial end of the internal thread, the molding core for molding the internal core can be easily removed by designing the molding die set so that the molding core may be moved away from the region of tight fit at an initial phase of removing the molding core from the internal thread.

Thus, according to the present invention, a play in a threading engagement can be easily minimized without reducing the smoothness of the relative movement between the mutually threading two parts, and the rigidity of the member to be actuated can be ensured.

Although the present invention has been described in terms of specific embodiments thereof, it is possible to modify and alter details thereof without departing from the spirit of the present invention. For instance, the localized parts of reduced tolerance or tighter fit in the threading engagement between the internal and external threads are not limited to the above described embodiment, but can be selected at will depending on the particular application.

What we claim is:

1. A linear actuator, comprising:
   a first molded plastic member provided with an internal thread;
   a second member provided with an external thread which is in relatively smooth threading engagement with said internal thread for converting a relative rotational movement between said first and second members into a relative linear movement between said first and second members;
   a localized region of relatively tight fit being provided in said threading engagement for minimizing play between said first and second members and without reducing the relatively smooth threading engagement; and
   wherein said localized region of relatively tight fit is provided by dimensioning a crest of said internal thread so as to be relatively tightly fit with a root of said external thread.

2. A linear actuator according to claim 1, wherein said localized region of relatively tight fit is provided in an axial end of said internal thread.

3. A linear actuator according to claim 2, wherein said localized region of relatively tight fit extends over approximately one half the pitch of said threads.

4. A linear actuator according to claim 1, wherein said linear movement is transmitted to an adjustable member of an automotive power seat.

5. A linear actuator according to claim 1, wherein said localized region of relatively tight fit is provided only in an axial end of said internal thread.

6. A linear actuator according to claim 1, wherein:
said first molded plastic member is a worm gear with a central bore including said internal thread; and
further including bearing means for supporting said worm gear such that said worm gear is rotatable around an axial line of said central bore, and wherein said worm gear is constrained against axial movement;
a worm rotatively actuated by a motor and meshing with said worm gear;
a screw rod including said external thread smoothly meshing with said internal thread over a length of threads, and functionally coupled with said second member;
guide means for guiding said screw rod for axial movement but constraining said screw rod against rotative movement; and
wherein said length of threads includes the localized region of relative tight fit of threads.

7. A linear actuator according to claim 1, wherein said first molded plastic member is a nut restrained from axial movement by a bearing in which said nut is rotatable; and said second member includes a screw rod having said external thread and wherein said screw rod is restrained from rotary movement and is linearly moved by rotation of said nut.

8. A linear actuator, comprising:
a first molded plastic member provided with an internal thread;
a second member provided with an external thread which is in relatively smooth threading engagement with said internal thread for converting a relative rotational movement between said first and second members into a relative linear movement between said first and second members;
a localized region of relatively tight fit being provided in said threading engagement for minimizing play between said first and second members and without reducing the relatively smooth threading engagement; and
wherein said localized region of relatively tight fit is provided by dimensioning a root of said internal thread so as to be relatively tightly fit with a crest of said external thread.

9. A linear actuator, according to claim 8, wherein said localized region of relatively tight fit is provided in an axial end of said internal thread.

10. A linear actuator, according to claim 8, wherein said linear movement is transmitted to an adjustable member of an automotive power seat.

11. A linear actuator, according to claim 8, wherein said first molded plastic member is a nut restrained from axial movement by a bearing in which said nut is rotatable; and said second member includes a screw rod having said external thread and wherein said screw rod is restrained from rotary movement and is linearly moved by rotation of said nut.

12. A linear actuator according to claim 8, wherein:
said first molded plastic member is a worm gear with a central bore including said internal thread; and
further including bearing means for supporting said worm gear such that said worm gear is rotatable around an axial line of said central bore, and wherein said worm gear is constrained against axial movement;
a worm rotatively actuated by a motor and meshing with said worm gear;
a screw rod including said external thread smoothly meshing with said internal thread over a length of threads, and functionally coupled with said second member;
guide means for guiding said screw rod for axial movement but constraining said screw rod against rotative movement; and
wherein said length of threads includes the localized region of relative tight fit of threads.

* * * * *